(12) United States Patent
Lee et al.

(10) Patent No.: US 11,712,089 B2
(45) Date of Patent: Aug. 1, 2023

(54) HARNESS SYSTEM WITH A BUCKLE RESTRAINING FUNCTION

(71) Applicant: Wonderland Switzerland AG, Steinhausen (CH)

(72) Inventors: Yen-Lin Lee, Taipei (TW); Kai-Wen Cheng, Taipei (TW); Chih-Wei Wang, Taipei (TW)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/535,597

(22) Filed: Nov. 25, 2021

(65) Prior Publication Data

US 2022/0079300 A1 Mar. 17, 2022

Related U.S. Application Data

(63) Continuation of application No. 16/516,250, filed on Jul. 18, 2019.

(Continued)

(51) Int. Cl.
*A44B 11/25* (2006.01)
*B60R 22/12* (2006.01)
*B60R 22/32* (2006.01)

(52) U.S. Cl.
CPC .......... *A44B 11/2553* (2013.01); *B60R 22/12* (2013.01); *A44B 11/2549* (2013.01);
(Continued)

(58) Field of Classification Search
CPC ............ A44B 11/2553; A44B 11/2561; A44B 11/2557; A44B 11/2549; A44B 11/2569; B60R 22/30; B60R 22/32
See application file for complete search history.

(56) References Cited

U.S. PATENT DOCUMENTS 3,209,424 A 10/1965 Cadiou
4,146,268 A 3/1979 Bost
(Continued)

FOREIGN PATENT DOCUMENTS

CN 1234996 A 11/1999
CN 102105078 A 6/2011
(Continued)

OTHER PUBLICATIONS

Cheng, the specification, including the claims, and drawings in the U.S. Appl. No. 17/707,985, filed Mar. 30, 2022.

*Primary Examiner* — Syed A Islam
(74) *Attorney, Agent, or Firm* — Winston Hsu

(57) ABSTRACT

A harness system includes an upper buckle, an upper strap and a restraining assembly including an anti-sliding structure and a beam structure. A through slot is formed on the upper buckle. The upper strap passes through the through slot. The beam structure is slidably disposed on the upper buckle. The anti-sliding structure is disposed on at least one of the beam structure and a wall of the through slot. The upper strap is engaged by the anti-sliding structure for restraining a sliding movement of the upper buckle relative to the upper strap and toward a shoulder portion when the upper strap is forced to drive the beam structure to slide relative to the upper buckle and toward the wall of the through slot.

8 Claims, 17 Drawing Sheets

Related U.S. Application Data

(60) Provisional application No. 62/755,547, filed on Nov. 4, 2018, provisional application No. 62/701,847, filed on Jul. 23, 2018.

(52) U.S. Cl.
CPC ....... *A44B 11/2557* (2013.01); *A44B 11/2561* (2013.01); *A44B 11/2569* (2013.01); *B60R 22/32* (2013.01)

(56) References Cited

U.S. PATENT DOCUMENTS

| | | | |
|---|---|---|---|
| 4,223,917 | A | 9/1980 | Mori |
| 4,551,889 | A * | 11/1985 | Narayan ................ A44B 11/10 24/171 |
| 4,944,557 | A | 7/1990 | Tsubai |
| 6,484,369 | B1 | 11/2002 | Conaway |
| 8,312,604 | B2 | 11/2012 | Heym |
| 8,783,782 | B2 | 7/2014 | Park |
| 8,931,806 | B2 | 1/2015 | Tabata |
| 9,204,691 | B2 | 12/2015 | Okano |
| 9,821,757 | B2 | 11/2017 | Moeker |
| 9,988,013 | B2 | 6/2018 | Cahill |
| 10,512,309 | B2 | 12/2019 | Lee |
| 2004/0158955 | A1 | 8/2004 | Acton |
| 2012/0019042 | A1 | 1/2012 | Park |
| 2013/0154335 | A1 | 6/2013 | Tabata |
| 2013/0341994 | A1 | 12/2013 | Boughner |
| 2015/0173461 | A1 | 6/2015 | Okano |
| 2017/0144623 | A1 | 5/2017 | Cahill |
| 2020/0022462 | A1 | 1/2020 | Lee |

FOREIGN PATENT DOCUMENTS

| | | | |
|---|---|---|---|
| CN | 103547488 A | | 1/2014 |
| CN | 105473391 A | | 4/2016 |
| CN | 110758313 A | | 2/2020 |
| DE | 1 233 188 | | 1/1967 |
| DE | 26 54 761 A1 | | 6/1978 |
| DE | 82 12 418 U1 | | 9/1983 |
| DE | 10 2008 037 963 A1 | | 2/2010 |
| DE | 10 2013 011 789 A1 | | 1/2015 |
| DE | 10 2013 216 326 A1 | | 2/2015 |
| EP | 2 634 038 A1 | | 9/2013 |
| JP | 8-58525 A | | 3/1996 |
| JP | 2004-136768 A | | 5/2004 |
| WO | 2012/154504 A2 | | 11/2012 |
| WO | 2015/140341 A1 | | 9/2015 |
| WO | 2018/104858 A1 | | 6/2018 |
| WO | WO-2018104858 A1 * | 6/2018 | ........... B60R 22/001 |

* cited by examiner

HARNESS SYSTEM WITH A BUCKLE RESTRAINING FUNCTION

CROSS REFERENCE TO RELATED APPLICATIONS

This is a continuation application of U.S. patent application Ser. No. 16/516,250, filed on Jul. 18, 2019, which claims the benefit of U.S. Provisional Patent Application No. 62/701,847 filed on Jul. 23, 2018 and U.S. Provisional Patent Application No. 62/755,547 filed on Nov. 4, 2018, and the entire contents of which are hereby incorporated by reference.

BACKGROUND OF THE INVENTION

1. Field of the Invention

The present invention relates to a harness system, and more particularly to a harness system with a buckle restraining function.

2. Description of the Prior Art

A harness system can secure a passenger inside a seat when the passenger sits on the seat. Please refer to FIG. 1. FIG. 1 is a partial diagram of a harness system 1' in the prior art. As shown in FIG. 1, the conventional harness system 1' includes a buckle assembly 11' and a strap assembly 12'. The buckle assembly 11' includes two upper buckle components 111' and a lower buckle component 112' which can be buckled with the two upper buckle components 111'. The strap assembly 12' includes two upper strap components 121' and a lower strap component 122'. Each upper strap component 121' is connected to the corresponding upper buckle component 111' by slidably passing through the corresponding upper buckle component 111', and each upper strap component 121' includes a shoulder portion 1211' and a waist portion 1212' divided by the corresponding upper buckle component 111'. The lower strap component 122' is connected to the lower buckle component 112' by passing through the lower buckle component 112'. The shoulder portions 1211' and the waist portions 1212' of the two upper strap components 121' and the lower strap component 122' can secure the passenger's body when the two upper buckle components 111' are buckled with the lower buckle component 112'.

However, when an emergency brake or a collision of a vehicle occurs, the waist portion 1212' of the upper strap component 121' is usually dragged by forward movement of the passenger's waist to drive the upper buckle component 111' to slide relative to the upper strap component 121' upwardly to reduce a length of the shoulder portion 1211' in a situation before forward movement of the passenger's upper body, such as the passenger's shoulder or chest. The reduced length of the shoulder portion 1211' restrains the forward movement of the passenger's upper body and increases an acceleration force acting on the passenger's upper body. Therefore, it may cause injury of the passenger's upper body.

SUMMARY OF THE INVENTION

Therefore, an objective of the present invention is to provide a harness system with a buckle restraining function for solving the aforementioned problem.

In order to achieve the aforementioned objective, the present invention discloses a harness system with a buckle restraining function. The harness system includes an upper buckle, an upper strap, a restraining assembly. The upper strap slidably passes through the upper buckle, and the upper strap includes a shoulder portion and a waist portion divided by the upper buckle. The restraining assembly is configured to restrain a sliding movement of the upper buckle relative to the upper strap and toward the shoulder portion when the waist portion of the upper strap is forced by a passenger's body during a collision or an emergency brake of a vehicle. A through slot is formed on the upper buckle. The restraining assembly includes an anti-sliding structure and a beam structure slidably disposed on the upper buckle. The upper strap passes through the through slot. The beam structure is slidably disposed on the upper buckle. The anti-sliding structure is disposed on at least one of the beam structure and a wall of the through slot, and the upper strap is engaged by the anti-sliding structure for restraining the sliding movement of the upper buckle relative to the upper strap and toward the shoulder portion when the upper strap is forced to drive the beam structure to slide relative to the upper buckle toward the wall of the through slot.

According to an embodiment of the present invention, the restraining assembly further includes a stopping component detachably disposed on the shoulder portion and configured to abut against the upper buckle for restraining the sliding movement of the upper buckle relative to the upper strap.

According to an embodiment of the present invention, the upper strap drives the beam structure to slide relative to the upper buckle and toward the wall of the through slot when the upper strap is forced by the passenger's body during the collision or the emergency brake of the vehicle.

According to an embodiment of the present invention, the restraining assembly further includes a stopping component detachably disposed on the shoulder portion and configured to abut against the upper buckle for restraining the sliding movement of the upper buckle relative to the upper strap.

According to an embodiment of the present invention, the through slot includes a first portion and a second portion divided by the beam structure. The first portion is adjacent to the shoulder portion. The second portion is adjacent to the waist portion. The upper strap passes through the first portion of the through slot from bottom to top and passes through the second portion of the through slot from top to bottom.

According to an embodiment of the present invention, the restraining assembly further includes a stopping component detachably disposed on the shoulder portion and configured to abut against the upper buckle for restraining the sliding movement of the upper buckle relative to the upper strap.

According to an embodiment of the present invention, the anti-sliding structure is disposed on at least one of a wall of the beam structure and a wall of the first portion of the through slot facing toward each other and configured to engage with the upper strap.

According to an embodiment of the present invention, the restraining assembly further includes a stopping component detachably disposed on the shoulder portion and configured to abut against the upper buckle for restraining the sliding movement of the upper buckle relative to the upper strap.

According to an embodiment of the present invention, the upper strap drives the beam structure to slide relative to the upper buckle and toward the wall of the first portion of the through slot facing toward the wall of the beam structure when the upper strap is forced by the passenger's body during the collision or the emergency brake of the vehicle, and the upper strap is engaged by the anti-sliding structure for restraining the sliding movement of the upper buckle relative to the upper strap and toward the shoulder portion when the upper strap is forced to drive the beam structure to slide relative to the upper buckle and toward the wall of the first portion of the through slot.

According to an embodiment of the present invention, the restraining assembly further includes a stopping component detachably disposed on the shoulder portion and configured to abut against the upper buckle for restraining the sliding movement of the upper buckle relative to the upper strap.

According to an embodiment of the present invention, the anti-sliding structure is disposed on the wall of the first portion of the through slot facing toward the wall of the beam structure and configured to engage with the upper strap.

According to an embodiment of the present invention, the restraining assembly further includes a stopping component detachably disposed on the shoulder portion and configured to abut against the upper buckle for restraining the sliding movement of the upper buckle relative to the upper strap.

According to an embodiment of the present invention, the anti-sliding structure is disposed on the wall of the first portion of the through slot facing toward the wall of the beam structure and configured to engage with the upper strap.

According to an embodiment of the present invention, the restraining assembly further includes a stopping component detachably disposed on the shoulder portion and configured to abut against the upper buckle for restraining the sliding movement of the upper buckle relative to the upper strap.

According to an embodiment of the present invention, the upper strap drives the beam structure to slide relative to the upper buckle and toward a wall of the first portion of the through slot when the upper strap is forced by the passenger's body during the collision or the emergency brake of the vehicle.

According to an embodiment of the present invention, the restraining assembly further includes a stopping component detachably disposed on the shoulder portion and configured to abut against the upper buckle for restraining the sliding movement of the upper buckle relative to the upper strap.

In summary, the present invention utilizes the anti-sliding structure having a higher coefficient of friction to engage with the upper strap. Therefore, the present invention can effectively restrain the sliding movement of the upper buckle relative to the upper strap and toward the shoulder portion by engagement of the anti-sliding structure and the upper strap when the waist portion of the upper strap is forced by a passenger's body during an emergency brake or a collision of a vehicle, which prevents an excessive decrease of a length of the shoulder portion of the upper strap and prevents a potential risk of injury of the passenger's upper body. Besides, the present invention further utilizes the stopping component detachably disposed on the shoulder portion to abut against the upper buckle. Therefore, the present invention can effectively restrain the sliding movement of the upper buckle relative to the upper strap and toward the shoulder portion by abutment of the stopping component and the upper buckle during the sliding movement of the upper buckle relative to the upper strap and toward the shoulder portion, which also prevents the excessive decrease of the length of the shoulder portion of the upper strap and prevents the potential risk of injury of the passenger's upper body.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
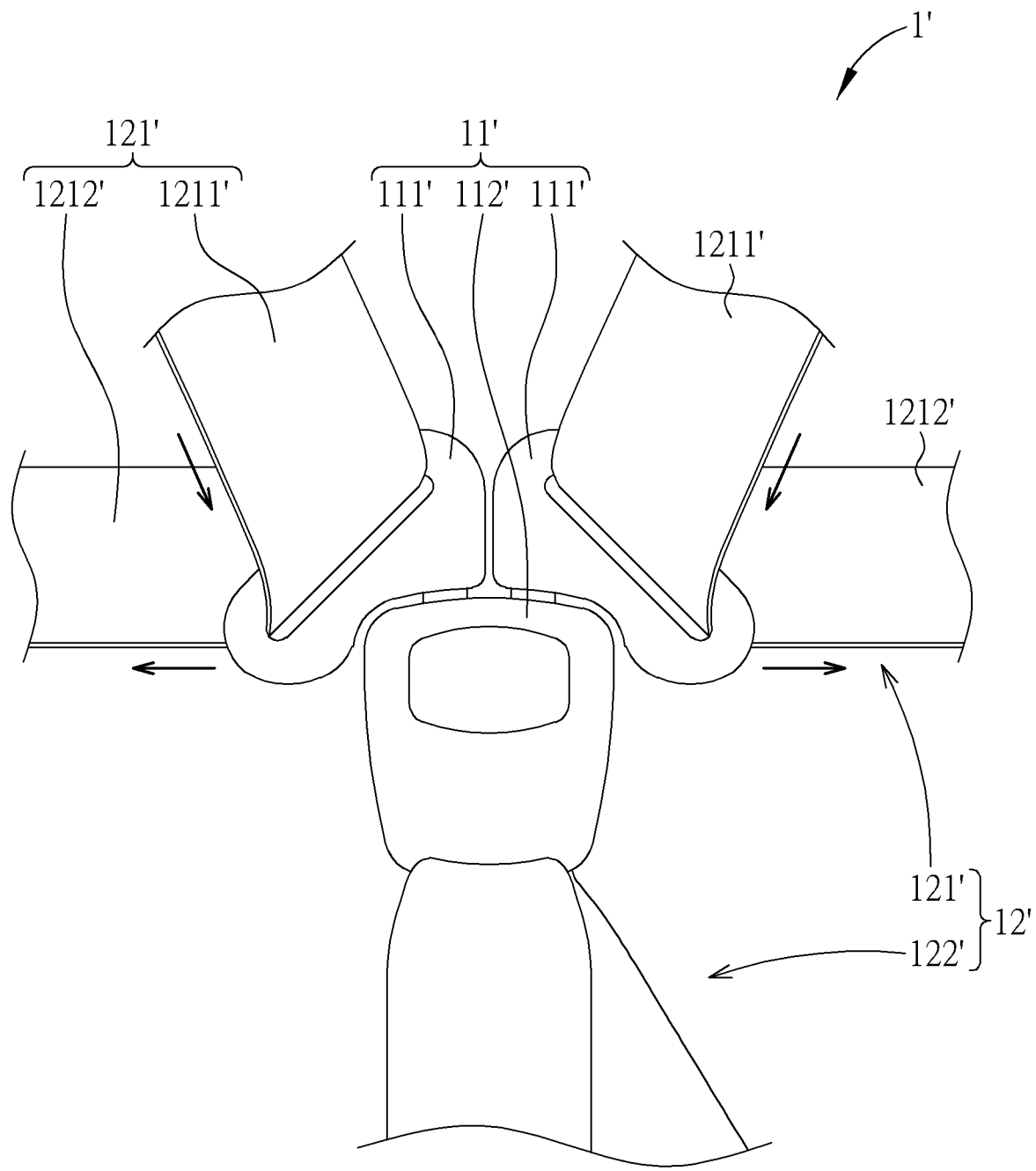
FIG. 1 is a partial diagram of a harness system in the prior art.
Figure 2:
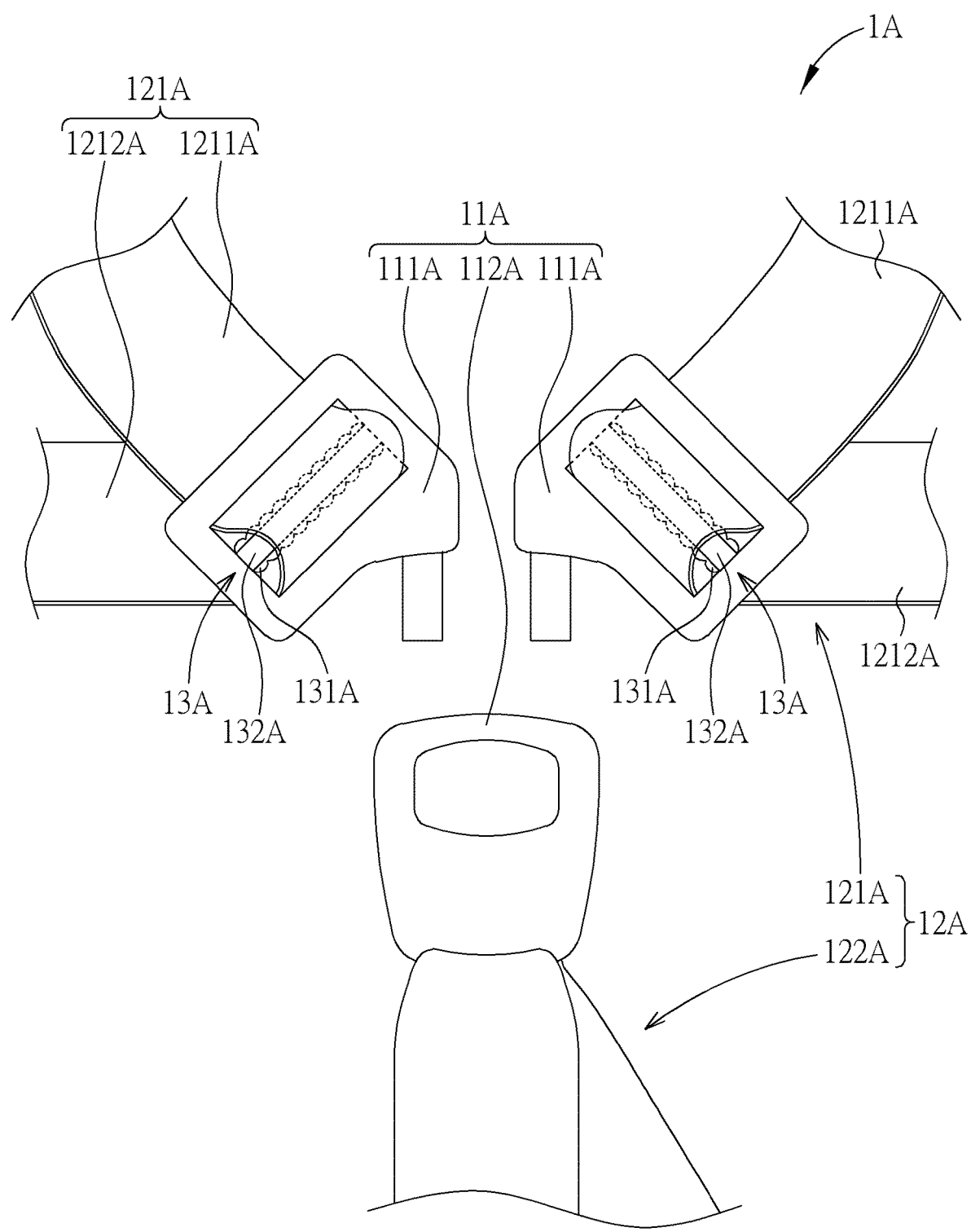
FIG. 2 is a partial diagram of a harness system according to a first embodiment of the present invention.
Figure 3:
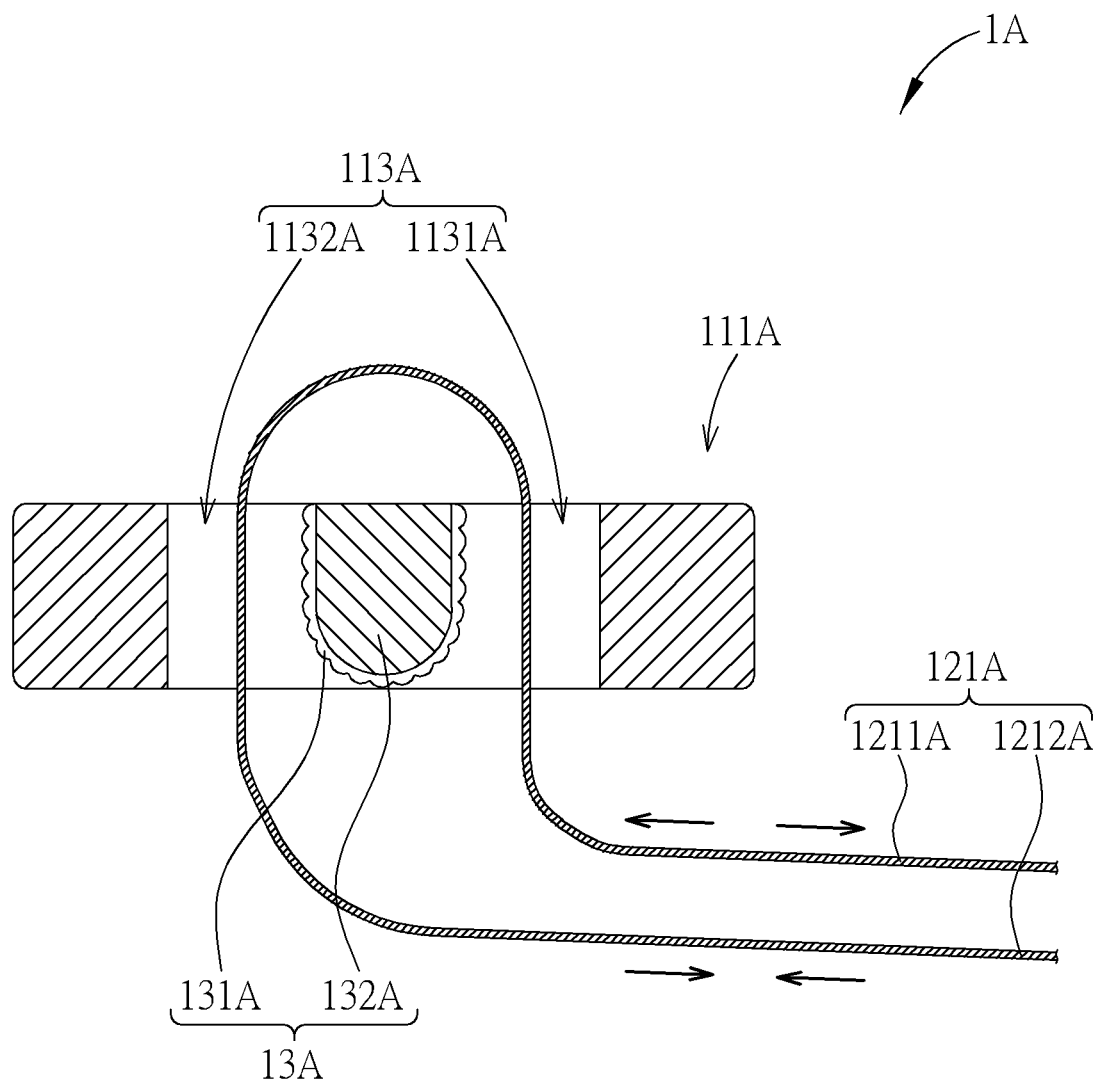
FIG. 3 is a partial sectional diagram of the harness system according to the first embodiment of the present invention.

Please refer to FIG. 2 and FIG. 3. FIG. 2 is a partial diagram of a harness system 1A according to a first embodiment of the present invention. FIG. 3 is a partial sectional diagram of the harness system 1A according to the first embodiment of the present invention. As shown in FIG. 2 and FIG. 3, the harness system 1A includes a buckle assembly 11A, a strap assembly 12A and two restraining assemblies 13A. The buckle assembly 11A includes two upper buckles 111A and a lower buckle 112A. The strap assembly 12A includes two upper straps 121A and a lower strap 122A. Each upper strap 121A is connected to the corresponding upper buckle 111A by slidably passing through the corresponding upper buckle 111A. The lower strap 122A is connected to the lower buckle 112A by slidably passing through the lower buckle 112A. The two upper straps 121A and the lower strap 122A can secure a passenger sitting in a seat when the two upper buckles 111A are buckled with the lower buckle 112A. Each upper strap 121A includes a shoulder portion 1211A and a waist portion 1212A divided by the corresponding upper buckle 111A. Each restraining assembly 13A is configured to restrain a sliding movement of the corresponding upper buckle 111A relative to the corresponding upper strap 121A and toward the shoulder portion 1211A of the corresponding upper strap 121A when the corresponding waist portion 1212A of the corresponding upper strap 121A is forced by the passenger's body during a collision or an emergency brake of a vehicle, to prevent an excessive decrease of a length of the shoulder portion 1211A of the corresponding upper strap 121A and prevent a potential risk of injury of the passenger's upper body.

In this embodiment, a through slot 113A is formed on each upper buckle 111A. Each restraining assembly 13A includes an anti-sliding structure 131A and a beam structure 132A. Each beam structure 132A is disposed on and fixed on the corresponding upper buckle 111A. Each through slot 113A includes a first portion 1131A and a second portion 1132A divided by the corresponding beam structure 132A. The first portion 1131A of each through slot 113A is adjacent to the shoulder portion 1211A of the corresponding upper strap 121A. The second portion 1132A of each through slot 113A is adjacent to the waist portion 1212A of the corresponding upper strap 121A. Each upper strap 121A passes through the first portion 1131A of the corresponding through slot 113A from bottom to top and passes through the second portion 1132A of the corresponding through slot 113A from top to bottom. Each anti-sliding structure 131A is disposed on a wall of the corresponding beam structure 132A and configured to engage with the corresponding upper strap 121A.

Specifically, the anti-sliding structure 131A can include a plurality of engaging teeth disposed on the wall of the beam structure 132A and located within the first portion 1131A and the second portion 1132A of the through slot 113A, so as to provide higher coefficient of friction between the upper strap 121A and the upper buckle 111A to prevent the upper buckle 111A from sliding relative to the upper strap 121A and toward the shoulder portion 1211A of the upper strap 121A. However, the present invention is not limited to this embodiment. For example, in another embodiment, the anti-sliding structure can include a plurality of engaging teeth located within one of the first portion and the second portion of the through slot. Alternatively, in another embodiment, the anti-sliding structure can include any other structure which provides a rough surface contacting with the upper strap for increasing coefficient of the friction between the upper strap and the upper buckle.

When the waist portion 1212A is forced by forward movement of the passenger's body during an emergency brake or a vehicle collision, the upper strap 121A is forced to attach with the anti-sliding structure 131A, so that the anti-sliding structure 131A can engage with the upper strap 121A for restraining the sliding movement of the upper buckle 111A relative to the upper strap 121A and toward the shoulder portion 1211A, so as to prevent the excessive decrease of the length of the shoulder portion 1211A of the corresponding upper strap 121A and prevent the potential risk of the injury of the passenger's upper body.

Figure 4:
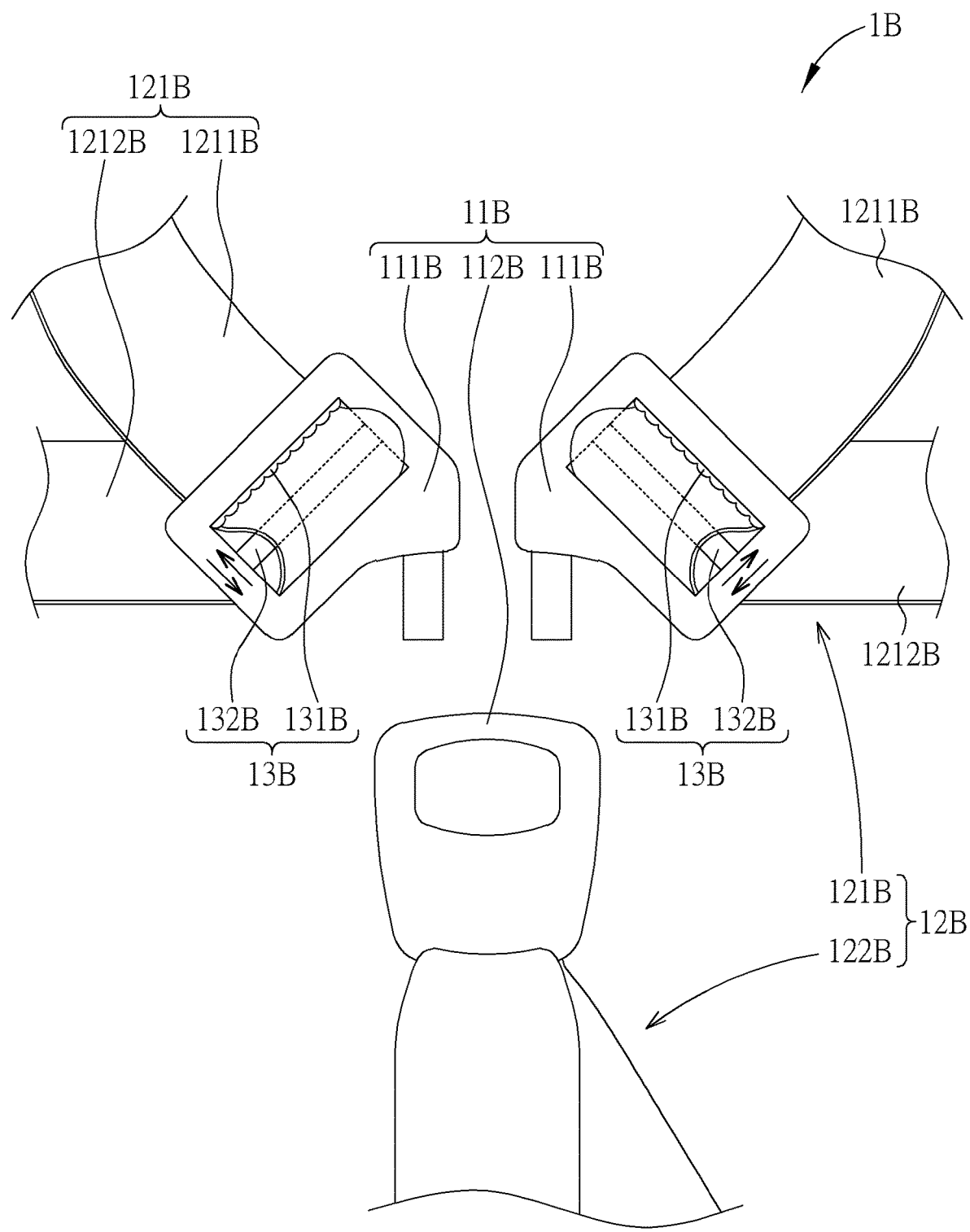
FIG. 4 is a partial diagram of a harness system according to a second embodiment of the present invention.
Figure 5:
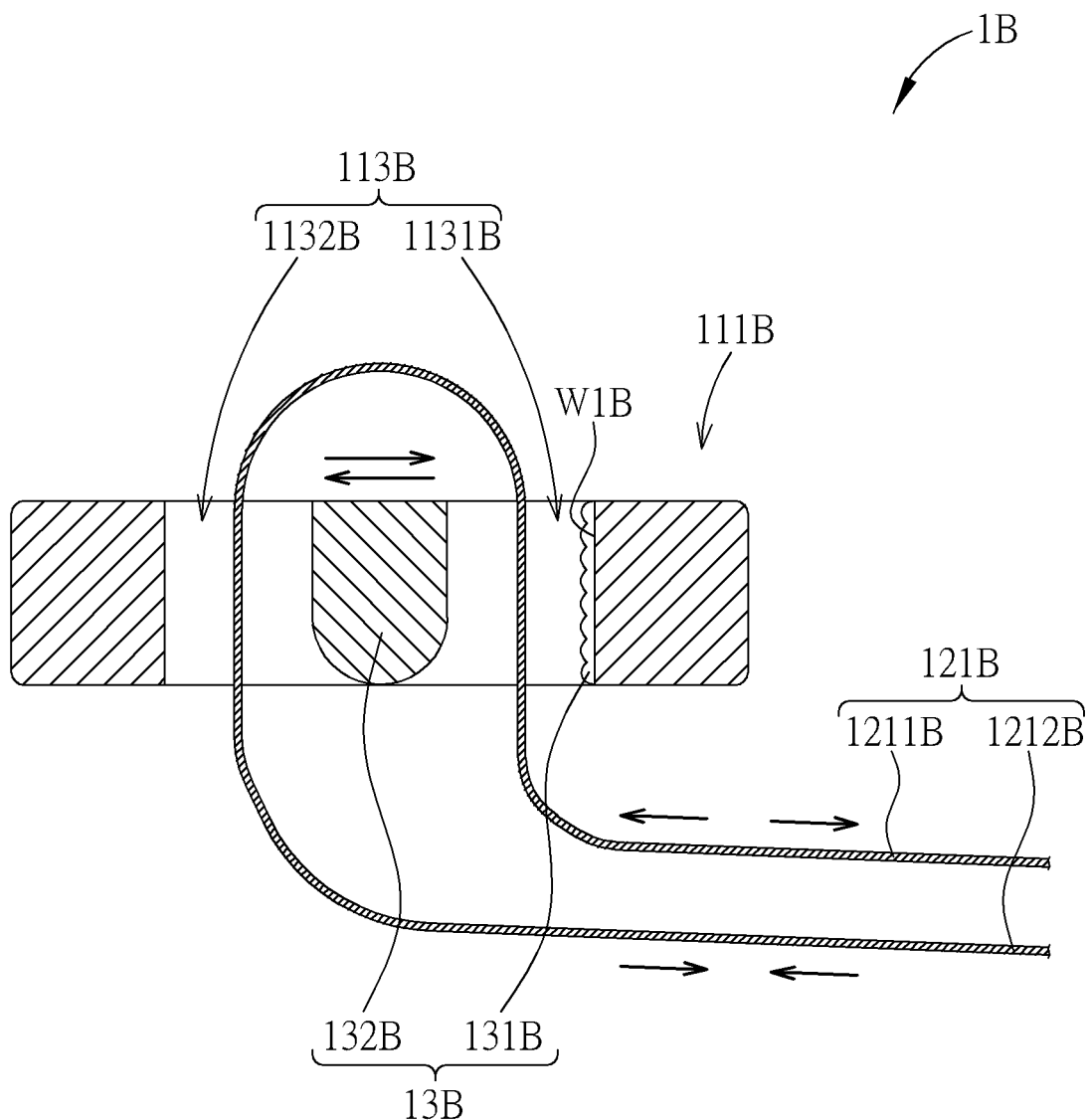
FIG. 5 is a partial sectional diagram of the harness system according to the second embodiment of the present invention.

Please refer to FIG. 4 and FIG. 5. FIG. 4 is a partial diagram of a harness system 1B according to a second embodiment of the present invention. FIG. 5 is a partial sectional diagram of the harness system 1B according to the second embodiment of the present invention. As shown in FIG. 4 and FIG. 5, the harness system 1B includes a buckle assembly 11B, a strap assembly 12B and two restraining assemblies 13B. The buckle assembly 11B includes two upper buckles 111B and a lower buckle 112B. The strap assembly 12B includes two upper straps 121B and a lower strap 122B. Each upper strap 121B is connected to the corresponding upper buckle 111B by slidably passing through the corresponding upper buckle 111B. The lower strap 122B is connected to the lower buckle 112B by slidably passing through the lower buckle 112B. Each upper strap 121B includes a shoulder portion 1211B and a waist portion 1212B divided by the corresponding upper buckle 111B.

Each restraining assembly 13B includes an anti-sliding structure 131B and a beam structure 132B. Each beam structure 132B is slidably disposed on the corresponding upper buckle 111B. A through slot 113B is formed on each upper buckle 111B and includes a first portion 1131B and a second portion 1132B divided by the corresponding beam structure 132B. Each first portion 1131B is adjacent to the corresponding shoulder portion 1211B. Each second portion 1132B is adjacent to the corresponding waist portion 1212B. Each upper strap 121B passes through the corresponding first portion 1131B from bottom to top and passes through the corresponding second portion 1132B from top to bottom. Each anti-sliding structure 131B is disposed on a wall W1B of the first portion 1131B of the corresponding through slot 113B facing toward the corresponding beam structure 132B and configured to engage with the corresponding upper strap 121B.

However, the present invention is not limited to this embodiment. For example, in another embodiment, the anti-sliding structure can be disposed on a wall of the beam structure facing toward the wall of the first portion of the through slot or disposed on both of the wall of the beam structure and the wall of the first portion of the through slot facing toward each other.

When the waist portion 1212B is forced by forward movement of the passenger's body during an emergency brake or a vehicle collision, the upper strap 121B is forced to drive the beam structure 132B to slide relative to the upper buckle 111B and toward the wall W1B of the first portion 1131B of the through slot 113B, so that the upper strap 121B is clamped between the beam structure 132B and the wall W1B of the first portion 1131B and is attached with the anti-sliding structure 131B. Therefore, the upper strap 121B can be engaged by the anti-sliding structure 131B for restraining the sliding movement of the upper buckle 111B relative to the upper strap 121B and toward the shoulder portion 1212B, so as to prevent an excessive decrease of a length of the shoulder portion 1211B of the corresponding upper strap 121B and prevent the potential risk of the injury of the passenger's upper body.

Figure 6:
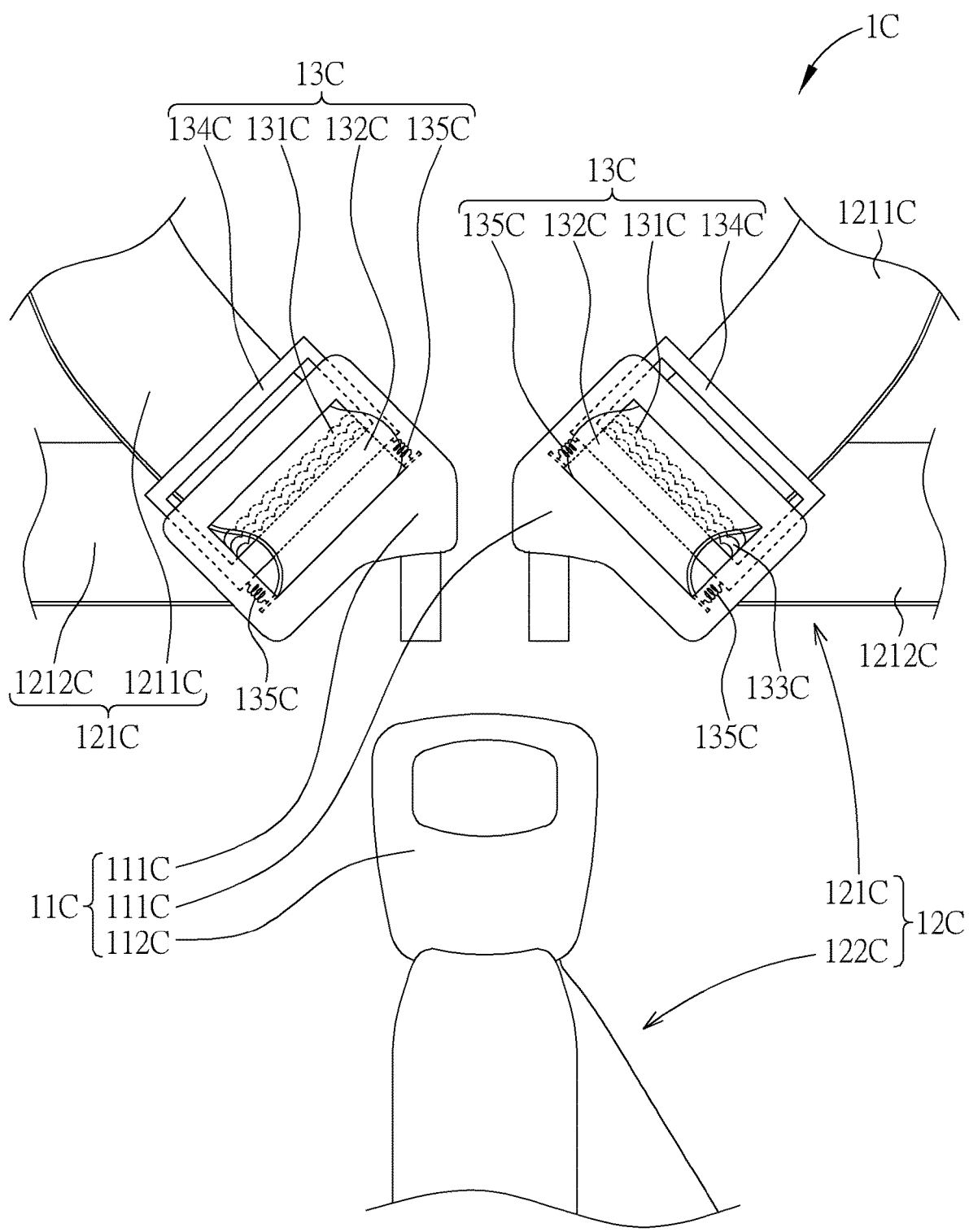
FIG. 6 is a partial diagram of a harness system according to a third embodiment of the present invention.
Figure 7:
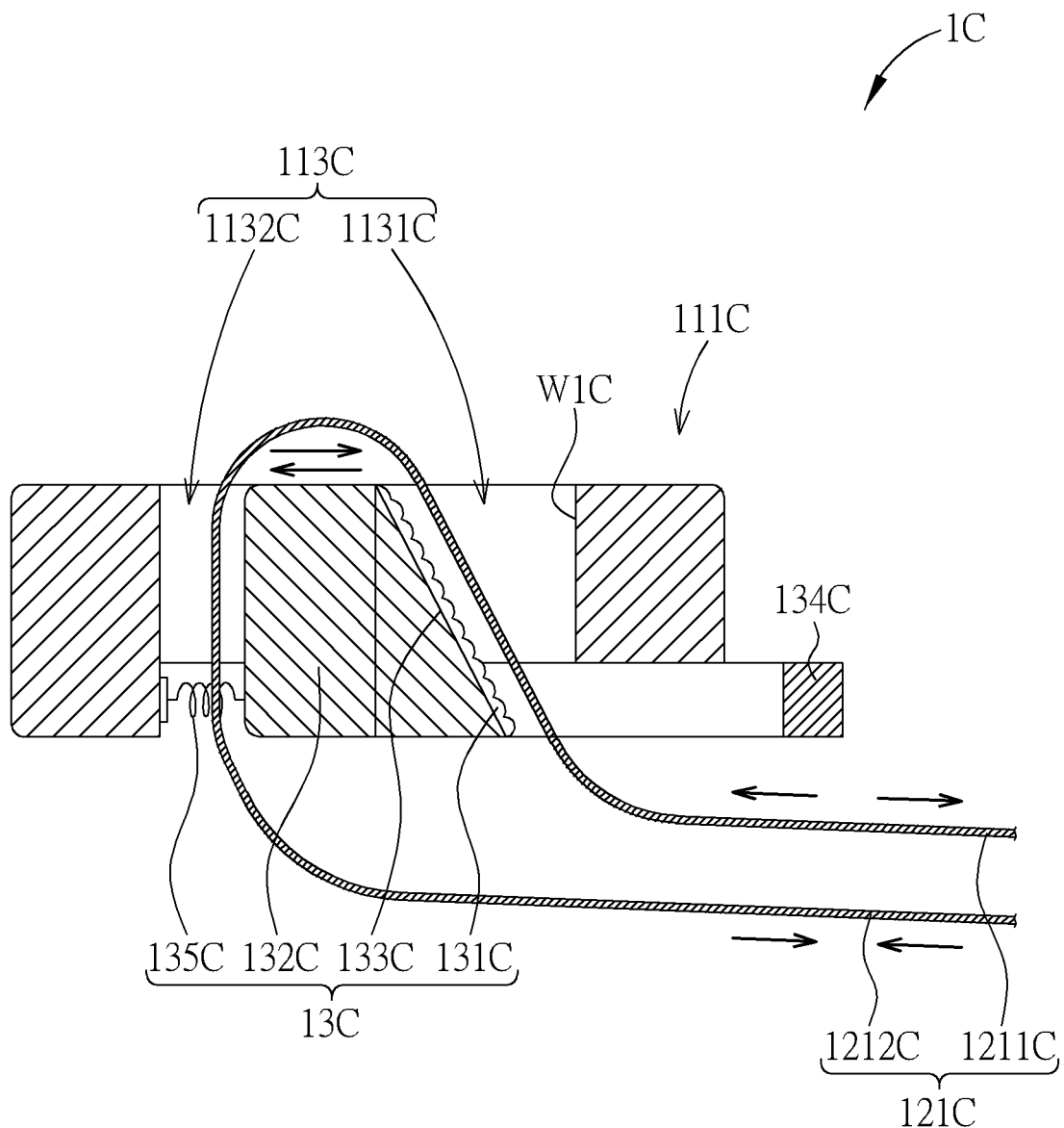
FIG. 7 is a partial sectional diagram of the harness system according to the third embodiment of the present invention.

Please refer to FIG. 6 and FIG. 7. FIG. 6 is a partial diagram of a harness system 1C according to a third embodiment of the present invention. FIG. 7 is a partial sectional diagram of the harness system 1C according to the third embodiment of the present invention. As shown in FIG. 6 and FIG. 7, the harness system 1C includes a buckle assembly 11C, a strap assembly 12C and two restraining assemblies 13C. The buckle assembly 11C includes two upper buckles 111C and a lower buckle 112C. The strap assembly 12C includes two upper straps 121C and a lower strap 122C. Each upper strap 121C is connected to the corresponding upper buckle 111C by slidably passing through the corresponding upper buckle 111C. The lower strap 122C is connected to the lower buckle 112C by slidably passing through the lower buckle 112C. Each upper strap 121C includes a shoulder portion 1211C and a waist portion 1212C divided by the corresponding upper buckle 111C.

Each restraining assembly 13C includes an anti-sliding structure 131C, a beam structure 132C, a slanted surface structure 133C, an operating structure 134C and two recovering components 135C. Each beam structure 132C is slidably disposed on the corresponding upper buckle 111C. Each operating structure 134C is connected to the corresponding beam structure 132C to form a rectangular component. A through slot 113C is formed on each upper buckle 111C and includes a first portion 1131C and a second portion 1132C divided by the corresponding beam structure 132C. Each first portion 1131C is adjacent to the corresponding shoulder portion 1211C. Each second portion 1132C is adjacent to the corresponding waist portion 1212C. Each upper strap 121C passes through the corresponding first portion 1131C from bottom to top and passes through the corresponding second portion 1132C from top to bottom. Each operating structure 134C is configured to drive the corresponding beam structure 132C to slide away from a wall W1C of the corresponding first portion 1131C. Each slanted surface structure 133C is disposed on a wall of the corresponding beam structure 132C adjacent to the corresponding first portion 1131C. A protruding length of each slanted surface structure 133C increases from top to bottom, so as to form a wedge-shaped structure or a trapezoid-shaped structure with the beam structure 132C. Each anti-sliding structure 131C is disposed on the corresponding slanted surface structure 133C and configured to engage with the upper strap 121C. Each recovering component 135C abuts between the corresponding beam structure 132C and the corresponding upper buckle 111C to bias the corresponding beam structure 132C to slide toward the wall W1C of the corresponding first portion 1131C of the corresponding through slot 113C.

In this embodiment, due to the configuration of the recovering component, the upper strap 121C is clamped between the beam structure 132C and the wall W1C of the first portion 1131C unless the beam structure 132C is driven to slide away from the wall W1C of the first portion 1131C by operating the operating structure 134C. Therefore, the upper strap 121C is attached with the anti-sliding structure 131C when the waist portion 1212C is forced to drive the upper buckle 111C to slide relative to the upper strap 121C and toward the shoulder portion 1211C. However, the upper strap 121C is not attached with the anti-sliding structure 131C due to the configuration of the slanted surface structure 133C when the shoulder portion 1211C is forced to drive the upper buckle 111C to slide relative to the upper strap 121C toward the waist portion 1212C, which facilitates the sliding movement of the upper buckle 111C relative to the upper strap 121C and toward the waist portion 1212C.

In detailed, when the waist portion 1212C is forced by forward movement of the passenger's body during an emergency brake or a vehicle collision, the upper strap 121C is forced to attach with the anti-sliding structure 131C because the upper strap 121C is clamped between the wall W1C of the first portion 1131C and the beam structure 132C driven by the recovering component 135C. Therefore, the upper strap 121C can be engaged by the anti-sliding structure 131C for restraining the sliding movement of the upper buckle 111C and relative to the upper strap 121C toward the shoulder portion 1211C, so as to prevent an excessive decrease of a length of the shoulder portion 1211C of the corresponding upper strap 121C and prevent the potential risk of the injury of the passenger's upper body.

Furthermore, when it is desired to slide the upper buckle 111C relative to the upper strap 121C toward the shoulder portion 1211C to manually extend a length of the waist portion 1212C, it has to operate the operating structure 134C to drive the beam structure 132C to slide away from the wall W1C of the first portion 1131C of the through slot 113C, so that the upper strap 121C is not clamped between the beam structure 132C and the wall W1C of the first portion 1131C. At this moment, the upper strap 121C is not attached with the anti-sliding structure 131C when the upper strap 121C is forced, and therefore, the upper buckle 111C is allowed to slide relative to the upper strap 121C and toward the shoulder portion 1211C to extend the length of the waist portion 1212C.

Besides, when it is desired to slide the upper buckle 111C relative to the upper strap 121C toward the waist portion 1212C to manually extend the length of the shoulder portion 1211C, the upper buckle 111C is allowed to slide relative to the upper strap 121C and toward the waist portion 1212C directly without operating the operating structure 134C because the upper strap 121C is not attach with the anti-sliding structure 131C due to the configuration of the slanted surface structure 133C when the shoulder portion 1211C is forced. In other words, the slanted surface structure 133C can achieve a purpose of only allowing the upper buckle 111C to slide relative to the upper strap 121C and toward the waist portion 1212C when the operating structure 134C is not operated.

Figure 8:
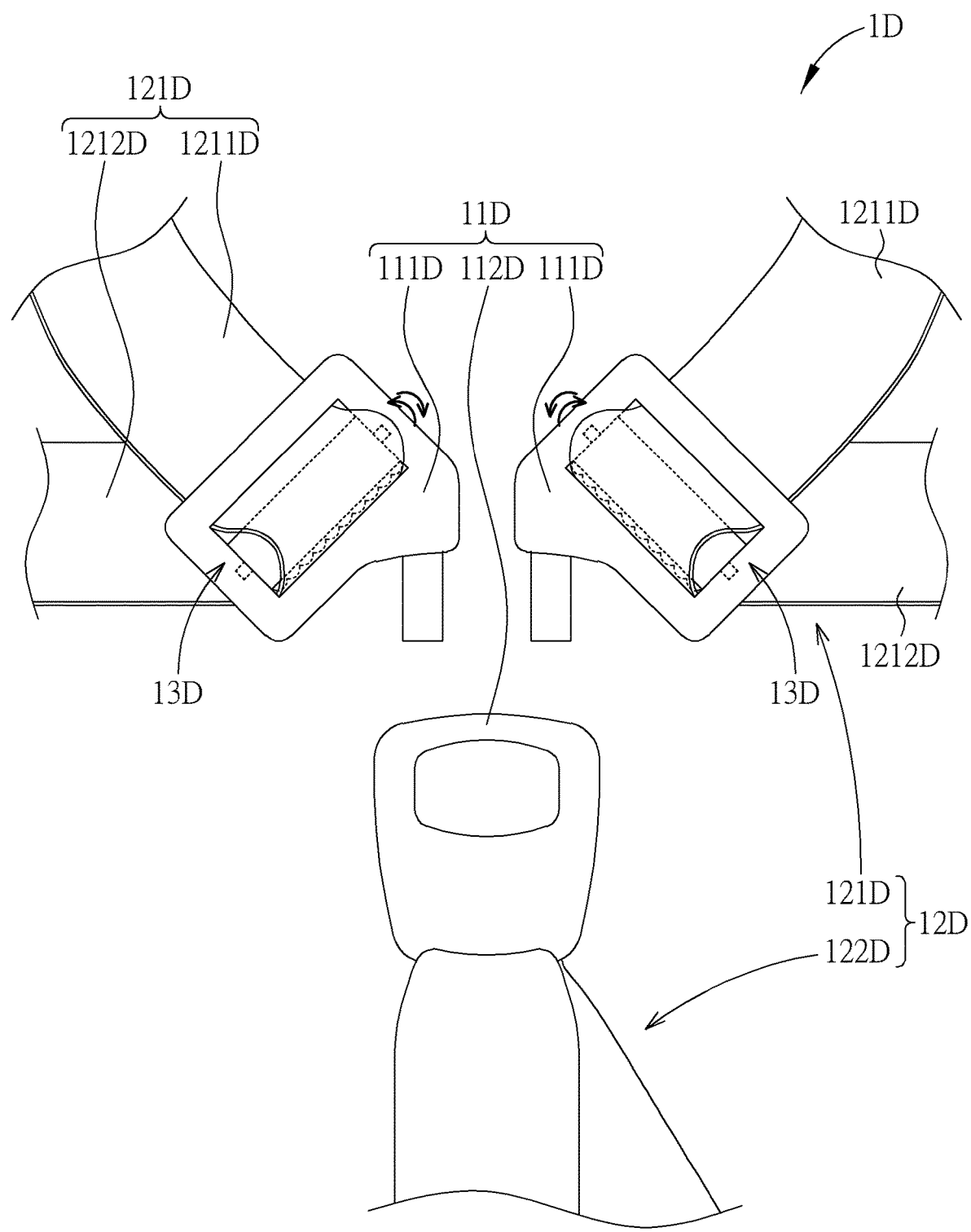
FIG. 8 is a partial diagram of a harness system according to a fourth embodiment of the present invention.
Figure 9:
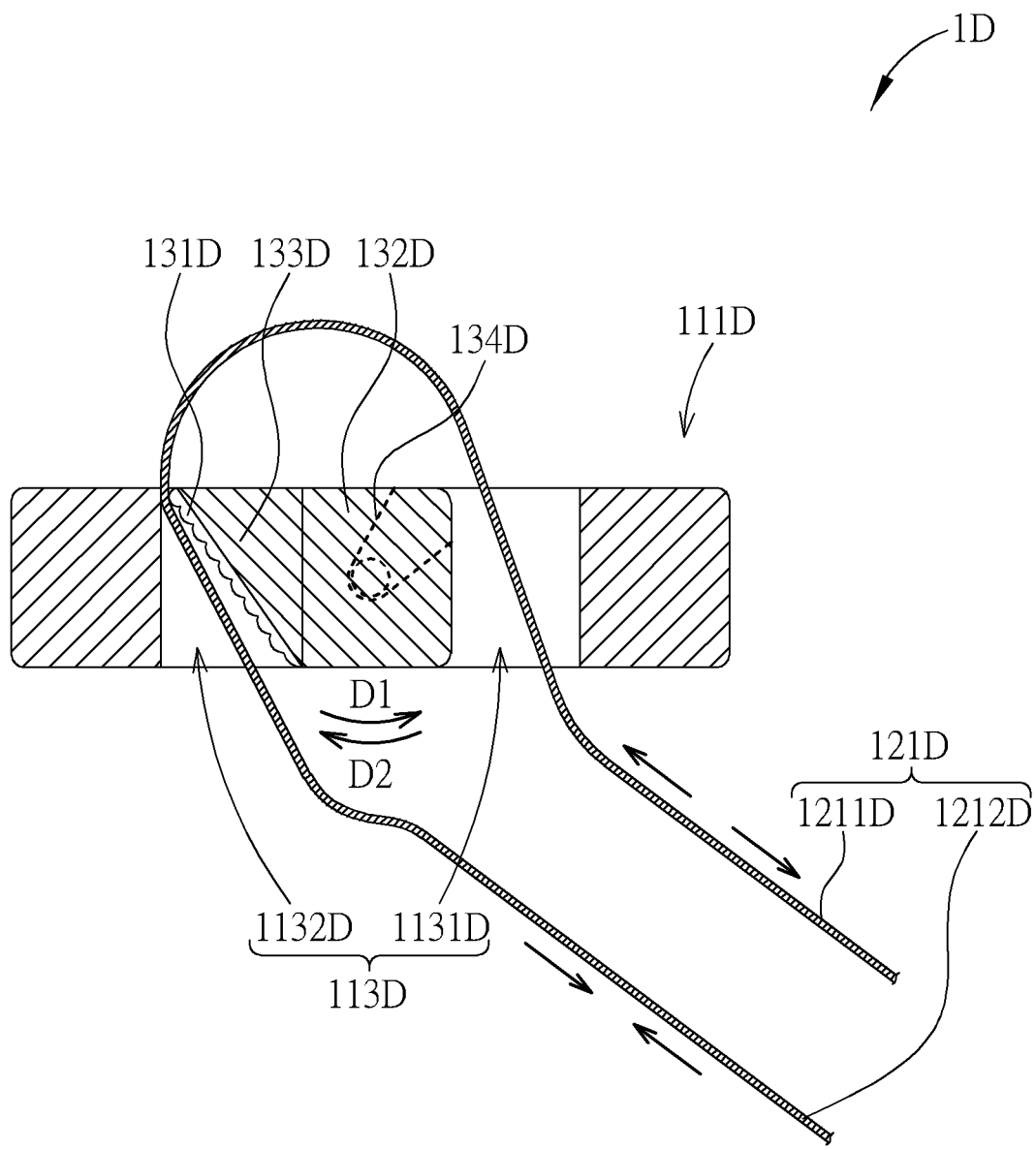
FIG. 9 is a partial sectional diagram of the harness system according to the fourth embodiment of the present invention.

Please refer to FIG. 8 and FIG. 9. FIG. 8 is a partial diagram of a harness system 1D according to a fourth embodiment of the present invention. FIG. 9 is a partial sectional diagram of the harness system 1D according to the fourth embodiment of the present invention. As shown in FIG. 8 and FIG. 9, the harness system 1D includes a buckle assembly 11D, a strap assembly 12D and two restraining assemblies 13D. The buckle assembly 11D includes two upper buckles 111D and a lower buckle 112D. The strap assembly 12D includes two upper straps 121D and a lower strap 122D. Each upper strap 121D slidably passes through the corresponding upper buckle 111D. Each upper strap 121D includes a shoulder portion 1211D and a waist portion 1212D divided by the corresponding upper buckle 111D. Each restraining assembly 13D includes an anti-sliding structure 131D, a beam structure 132D, a slanted surface structure 133D and a recovering component 134D. A through slot 113D is formed on each upper buckle 111D. Each beam structure 132D is rotatably disposed on the corresponding upper buckle 111D. Each through slot 113D includes a first portion 1131D and a second portion 1132D divided by the corresponding beam structure 132D. Each first portion 1131D is adjacent to the corresponding shoulder portion 1211D. Each second portion 1132D is adjacent to the corresponding waist portion 1212D. Each upper strap 121D passes through the first portion 1131D of the corresponding through slot 113D from bottom to top and passes through the corresponding second portion 1132D from top to bottom. Each slanted surface structure 133D is disposed on a wall of the corresponding beam structure 132D adjacent to a wall of the corresponding second portion 1132D. A protruding length of each slanted surface structure 133D increases from bottom to top, so as to form a wedge-shaped structure or a trapezoid-shaped structure with the beam structure 132D. Each anti-sliding structure 131D is disposed on the corresponding slanted surface structure 133D. Each recovering component 134D abuts between the corresponding beam structure 132D and the corresponding upper buckle 111D and configured to bias the corresponding beam structure 132D to rotate along an engaging direction D1.

In this embodiment, the upper strap 121D is clamped between the beam structure 132D and the wall of the second portion 1132D unless the beam structure 132D is driven to rotate along a disengaging direction D2 opposite to the engaging direction D1. Therefore, the upper strap 121D is attached with the anti-sliding structure 131D when the waist portion 1212D is forced to drive the upper buckle 111D to slide relative to the upper strap 121D and toward the shoulder portion 1211D. However, the upper strap 121D is not attached with the anti-sliding structure 131D due to the configuration of the slanted surface structure 133D and rotating movement of the beam structure 132D along the disengaging direction D2 when the shoulder portion 1211D is forced to drive the upper buckle 111D to slide relative to the upper strap 121D and toward the waist portion 1212D, which facilitates the upper buckle 111D to slide relative to the upper strap 121D and toward the waist portion 1212D.

In detailed, when the waist portion 1212D is forced by forward movement the passenger's body during an emergency brake or a vehicle collision, the upper strap 121D is forced to attach with the anti-sliding structure 131D because the upper strap 121D is clamped between the wall of the second portion 1131D and the beam structure 132D driven by the recovering component 134D. Therefore, the upper strap 121D can be engaged by the anti-sliding structure 131D for restraining the sliding movement of the upper buckle 111D relative to the upper strap 121D and toward the shoulder portion 1211D, so as to prevent an excessive decrease of a length of the shoulder portion 1211D of the corresponding upper strap 121D and prevent the potential risk of the injury of the passenger's upper body.

When the shoulder portion 1211D is forced to slide the upper buckle 111D relative to the upper strap 121D and toward the waist portion 1212D, the beam structure 132D is driven by the upper strap 121D to rotate relative to upper buckle 111D along the disengaging direction D2, so that the upper strap 121D is not clamped between the wall of the second portion 1132D and the beam structure 132D and not attached with the anti-sliding structure 131D due to the configuration of the slanted surface structure 132D. Therefore, the upper buckle 111D is allowed to slide relative to the upper strap 121C and toward the shoulder portion 1211D.

Preferably, in an embodiment, each restraining assembly can further include an angle restraining component for restraining a rotating angle of the beam structure, so as to prevent an excessive rotation of the beam structure. For example, the angle restraining component can prevent the slanted surface structure and the anti-sliding structure from rotating into the first portion. Furthermore, in another embodiment, the beam structure can include a rotating plate and a shaft. The rotating plate is rotatably disposed on the upper buckle by the shaft and made of metal or plastic material. The anti-sliding structure is disposed on the rotating plate.

Figure 10:
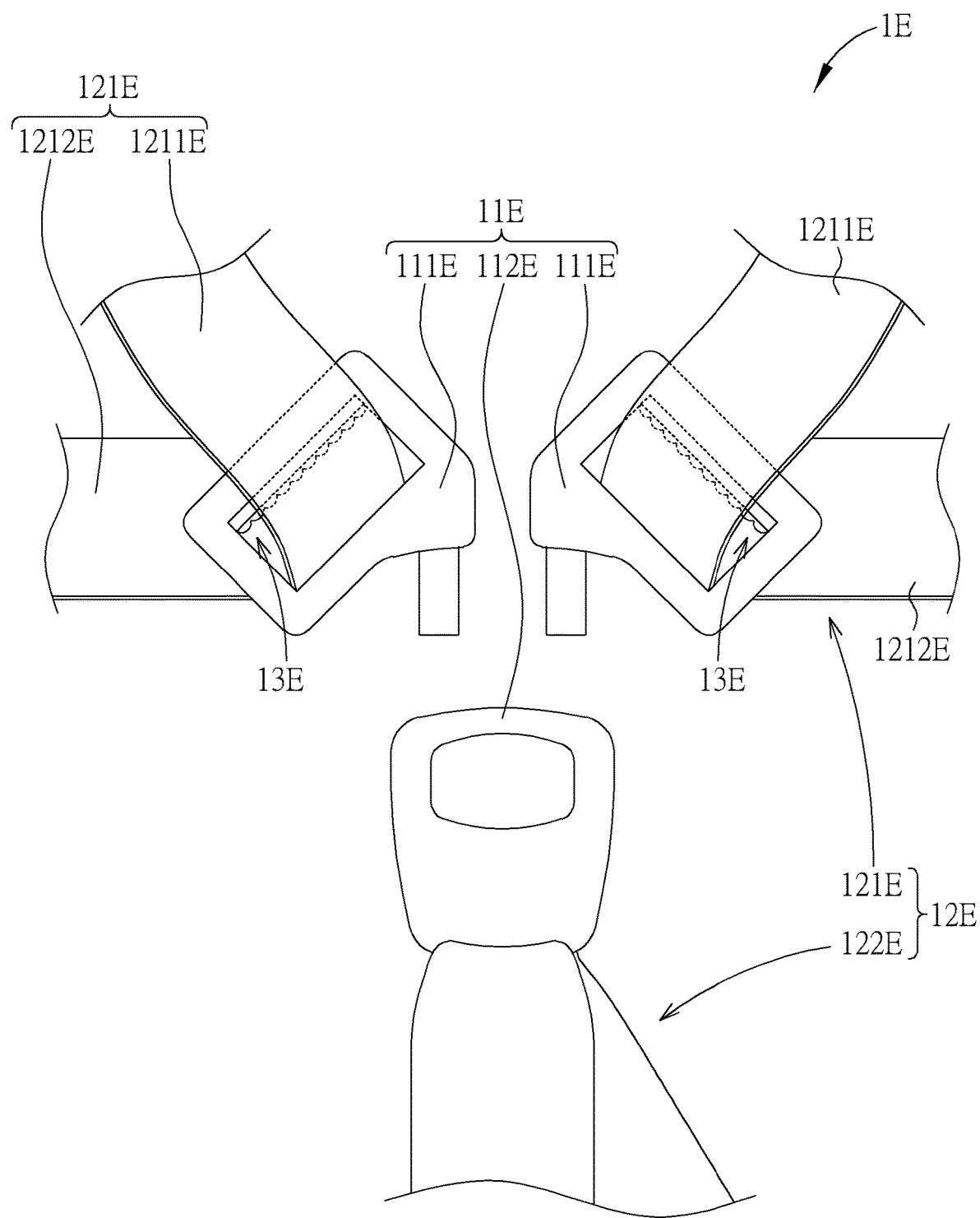
FIG. 10 is a partial diagram of a harness system according to a fifth embodiment of the present invention.
Figure 11:
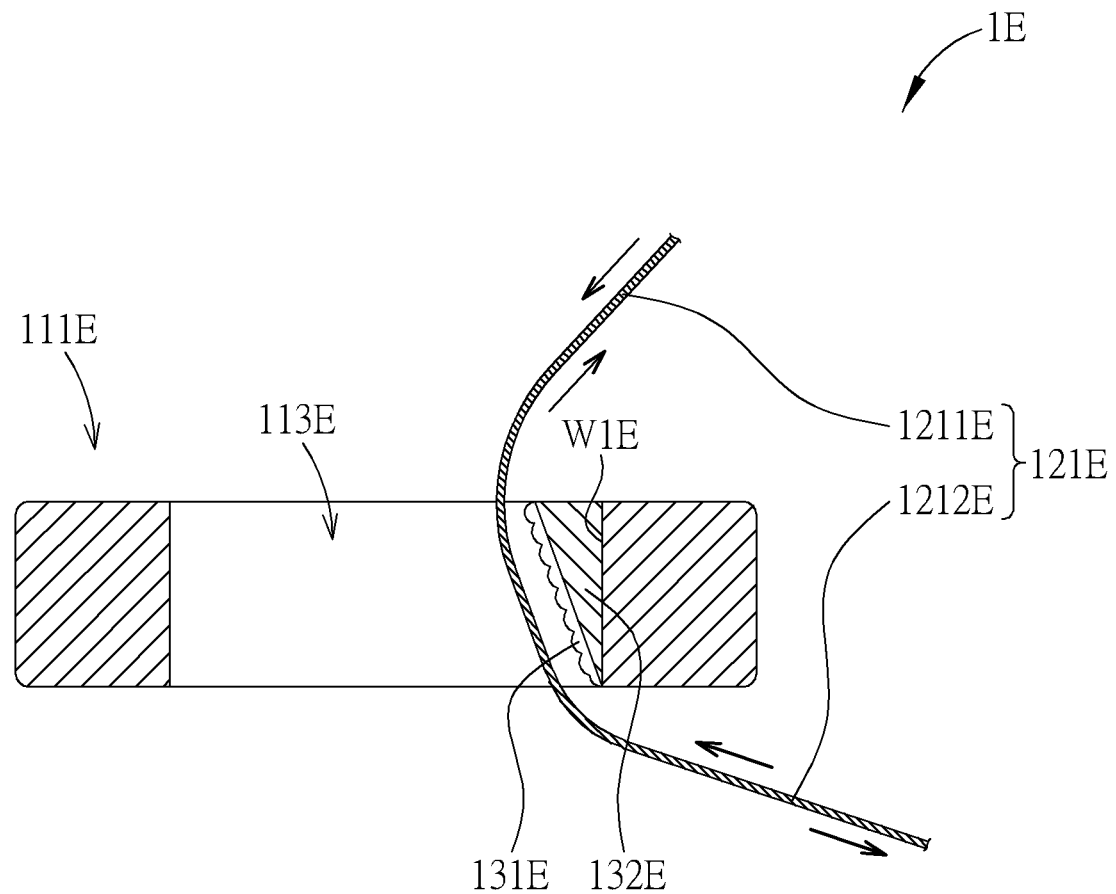
FIG. 11 is a partial sectional diagram of the harness system according to the fifth embodiment of the present invention.

Please refer to FIG. 10 and FIG. 11. FIG. 10 is a partial diagram of a harness system 1E according to a fifth embodiment of the present invention. FIG. 11 is a partial sectional diagram of the harness system 1E according to the fifth embodiment of the present invention. As shown in FIG. 10 and FIG. 11, the harness system 1E includes a buckle assembly 11E, a strap assembly 12E and two restraining assemblies 13E. The buckle assembly 11E includes two upper buckles 111E and a lower buckle 112E. The strap assembly 12E includes two upper straps 121E and a lower strap 122E. Each upper strap 121E slidably passes through the corresponding upper buckle 121E. Each upper strap 121E includes a shoulder portion 1211E and a waist portion 1212E divided by the corresponding upper buckle 111E. Each restraining assembly 13E includes an anti-sliding structure 131E and a slanted surface structure 132E. A through slot 113E is formed on each upper buckle 111E. Each upper strap 121E passes through the corresponding through slot 113E. Each slanted surface structure 132E is disposed on a wall W1E of the corresponding through slot 113E. A protruding length of each slanted surface structure 132E increases from bottom to top. Each anti-sliding structure 131E is disposed on the corresponding slanted surface structure 132E. In this embodiment, the upper strap 121E is forced to attach with the anti-sliding structure 131E when the waist portion 1212E is forced to drive the upper buckle 111E to slide relative to the upper strap 121E and toward the shoulder portion 1211E, so that the upper strap 121E can be engaged by the anti-sliding structure 131E. However, the upper strap 121E is not attached with the anti-sliding structure 131E due to the configuration of the slanted surface structure 132E when the shoulder portion 1211E is forced to drive the upper buckle 111E to slide relative to the upper strap 121E and toward the waist portion 1212E.

Figure 12:
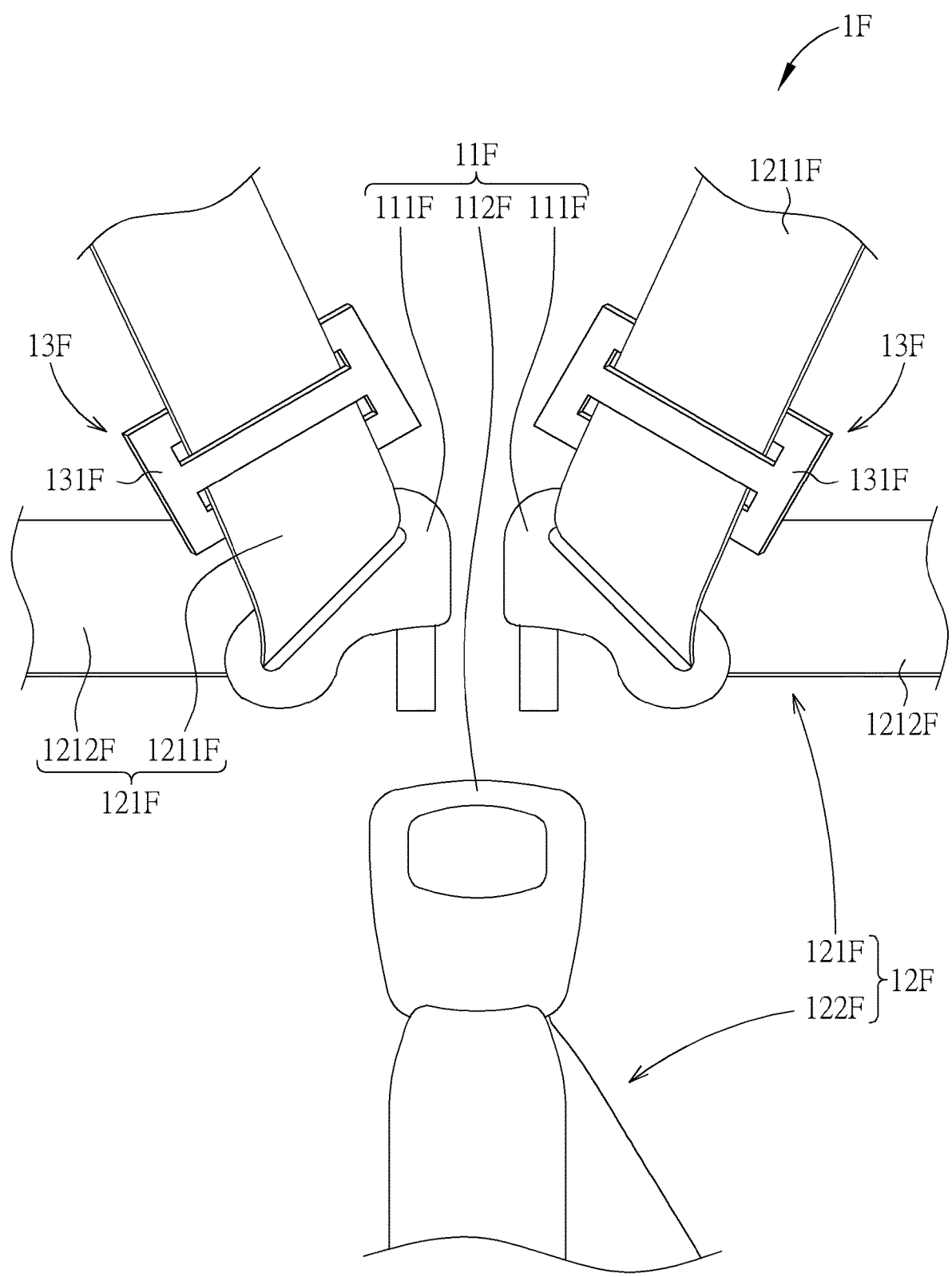
FIG. 12 is a partial diagram of a harness system according to a sixth embodiment of the present invention.

Please refer to FIG. 12. FIG. 12 is a partial diagram of a harness system 1F according to a sixth embodiment of the present invention. As shown in FIG. 12, the harness system 1F includes a buckle assembly 11F, a strap assembly 12F and two restraining assemblies 13F. The buckle assembly 11F includes two upper buckles 111F and a lower buckle 112F. The strap assembly 12F includes two upper straps 121F and a lower strap 122F. Each upper strap 121F slidably passes through the corresponding upper buckle 111F. The lower strap 111F slidably passes through the lower buckle 112F. Each upper strap 121F includes a shoulder portion 1211F and a waist portion 1212F divided by the corresponding upper buckle 111F. Each restraining assembly 13F includes a stopping component 131F detachably disposed on the corresponding shoulder portion 1211F configured to abut against the upper buckle 111F for restraining a sliding movement of the upper buckle 111F relative to the upper strap 121F.

Preferably, in this embodiment, static friction between the stopping component 131F and the shoulder portion 1211F can prevent the stopping component 131F from moving relative to the shoulder portion 1211F after the stopping component 131F is disposed on the shoulder portion 1211F. The stopping component 131F can be spaced apart the upper buckle 111F. The stopping component 131F can include a tri-glide component. However, the present invention is not limited to this embodiment. For example, in another embodiment, the stopping component can still slide relative to the shoulder portion after the stopping component is disposed on the shoulder portion. Alternatively, in another embodiment, the stopping component can abut against the upper buckle rather than being spaced apart from the upper buckle when the stopping component is disposed on the shoulder portion. Alternatively, in another embodiment, the stopping component also can be an E-shaped component, such as an E-shaped plate, or any other component, such as a clipping component, e.g., a paper clip or a hair clip, a buckling component, a Velcro component, and etc. Furthermore, the stopping component can be made of metal or plastic material.

Figure 13:
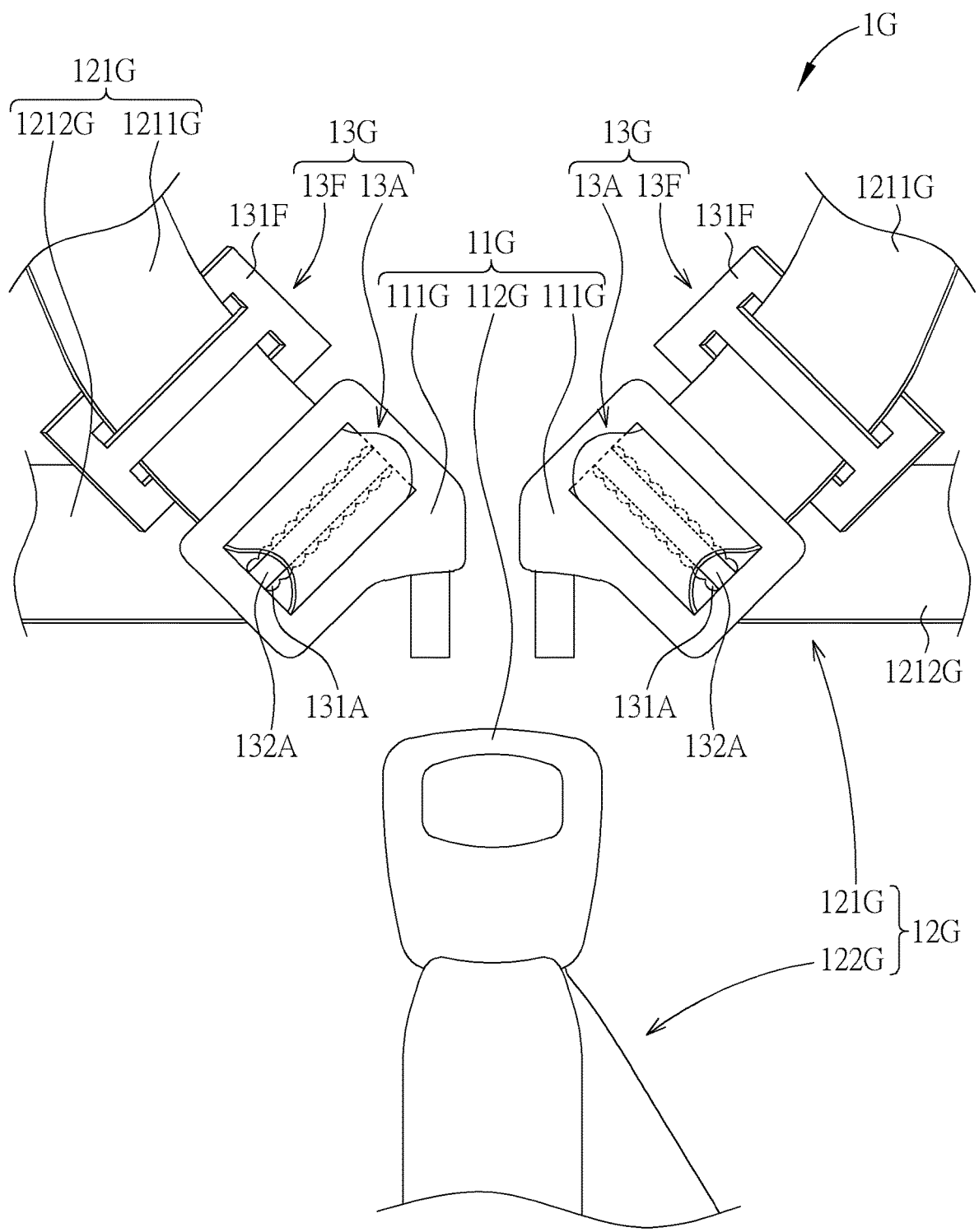
FIG. 13 to FIG. 17 are partial diagrams of a harness system according to other embodiments of the present invention.
Figure 14:
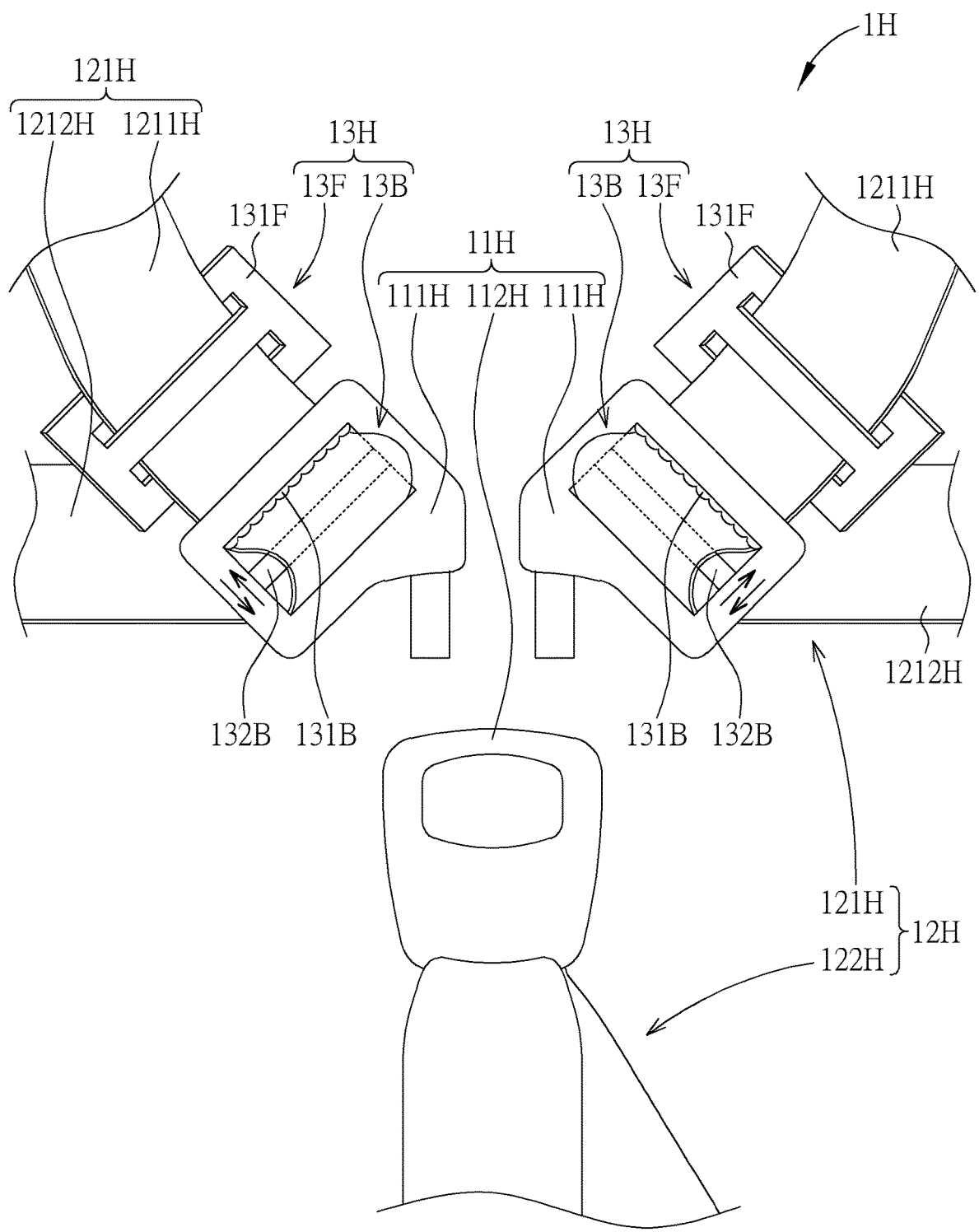
Figure 15:
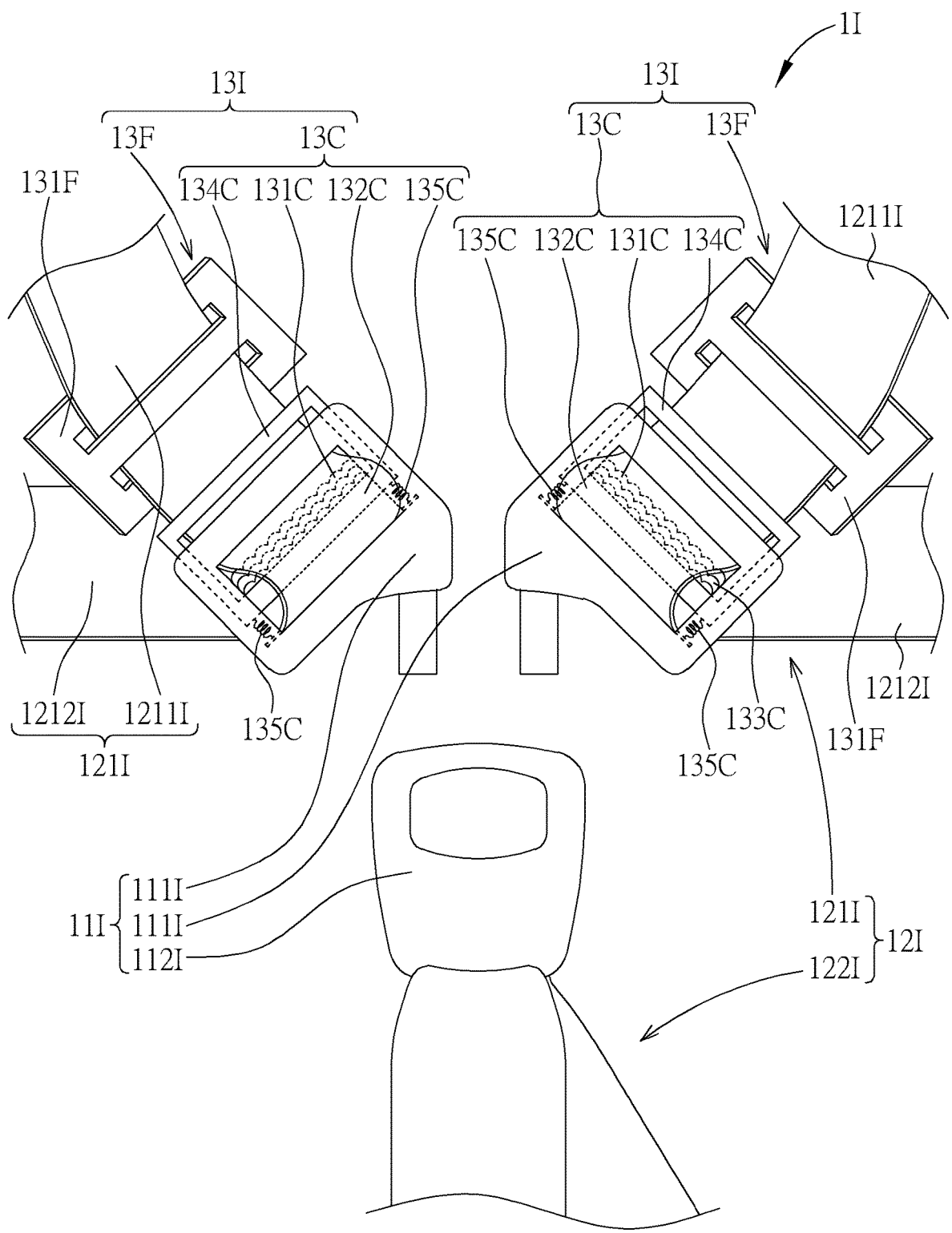
Figure 16:
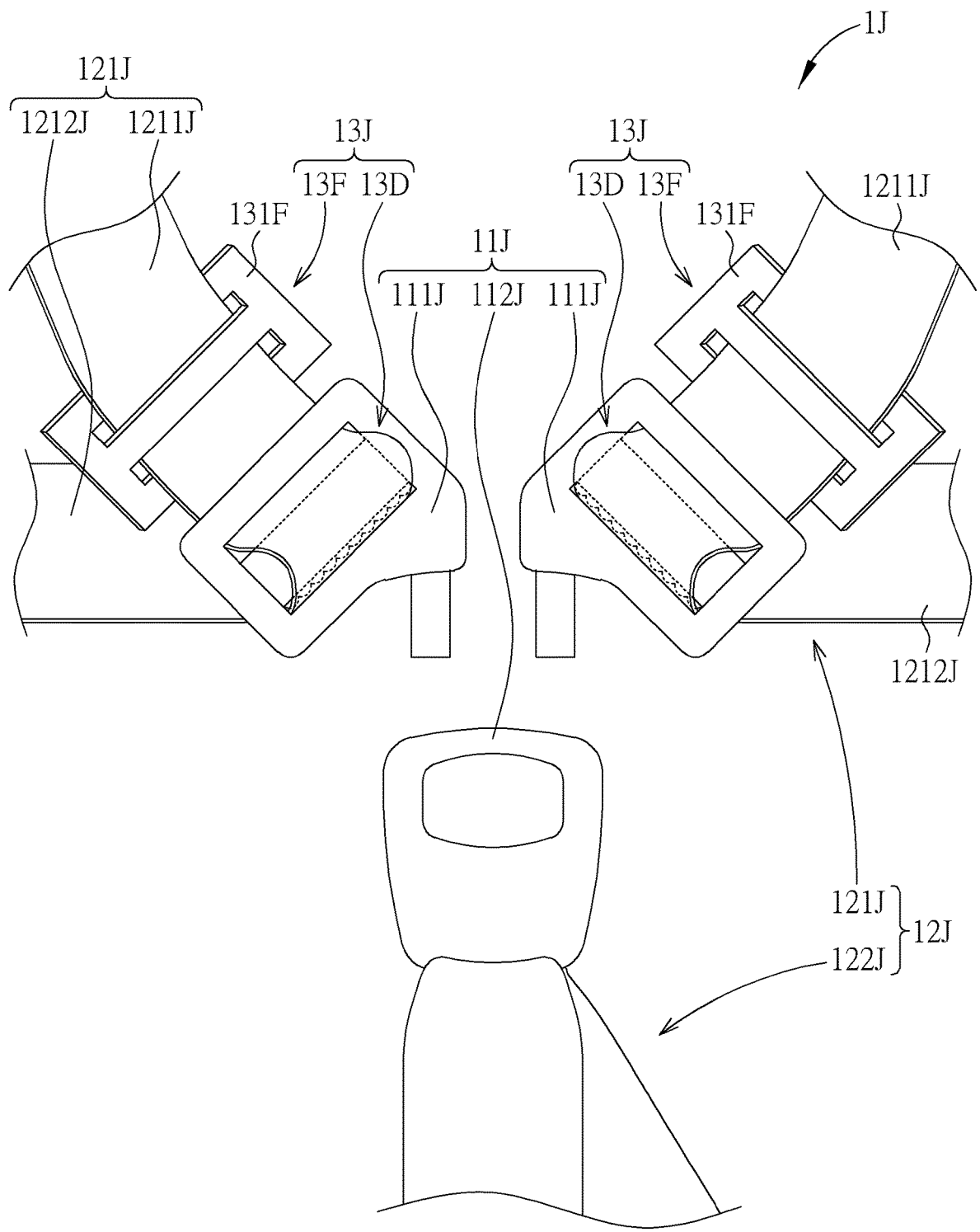
Figure 17:
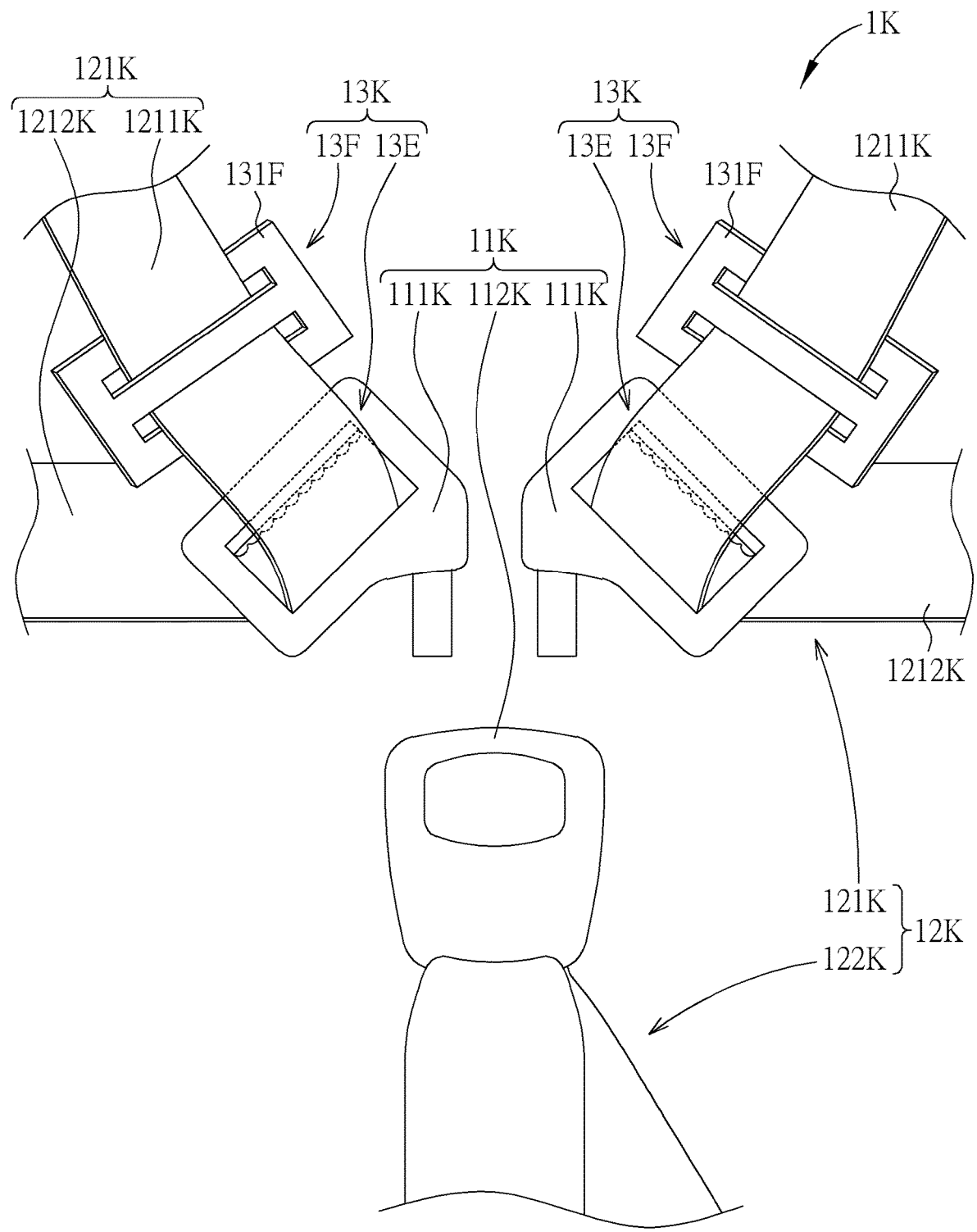

Besides, the harness system of one of the first embodiment to the fifth embodiment also can further include the stopping component detachably disposed on the shoulder portion of the upper strap. Please refer to FIG. 13 to FIG. 17. FIG. 13 to FIG. 17 are partial diagrams of a harness system according to other embodiments of the present invention. As shown in FIG. 13 to FIG. 17, the sliding movement of the upper buckle relative to the upper strap and toward the shoulder portion can be restrained by the stopping component and the anti-sliding structure cooperatively. As shown in FIG. 13, a harness system 1G includes a restraining assembly 13G which incorporates the restraining assembly 13A of the first embodiment and the restraining assembly 13F of the sixth embodiment. As shown in FIG. 14, a harness system 1H includes a restraining assembly 13H which incorporates the restraining assembly 13B of the second embodiment and the restraining assembly 13F of the sixth embodiment. As shown in FIG. 15, a harness system 1I includes a restraining assembly 13I which incorporates the restraining assembly 13C of the third embodiment and the restraining assembly 13F of the sixth embodiment. As shown in FIG. 16, a harness system 1J includes a restraining assembly 13J which incorporates the restraining assembly 13D of the fourth embodiment and the restraining assembly 13F of the sixth embodiment. As shown in FIG. 17, a harness system 1K includes a restraining assembly 13K which incorporates the restraining assembly 13E of the fifth embodiment and the restraining assembly 13F of the sixth embodiment. Detailed description for the stopping component and the anti-sliding structure is omitted herein for simplicity.

In contrast to the prior art, the present invention utilizes the anti-sliding structure having a higher coefficient of friction to engage with the upper strap. Therefore, the present invention can effectively restrain the sliding movement of the upper buckle relative to the upper strap and toward the shoulder portion by engagement of the anti-sliding structure and the upper strap when the waist portion of the upper strap is forced by a passenger's body during an emergency brake or a collision of a vehicle, which prevents an excessive decrease of a length of the shoulder portion of the upper strap and prevents a potential risk of injury of the passenger's upper body. Besides, the present invention further utilizes the stopping component detachably disposed on the shoulder portion to abut against the upper buckle. Therefore, the present invention can effectively restrain the sliding movement of the upper buckle relative to the upper strap and toward the shoulder portion by abutment of the stopping component and the upper buckle during the sliding movement of the upper buckle relative to the upper strap and toward the shoulder portion, which also prevents the excessive decrease of the length of the shoulder portion of the upper strap and prevents the potential risk of injury of the passenger's upper body.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A harness system with a buckle restraining function, the harness system comprising:
   an upper buckle;
   an upper strap slidably passing through the upper buckle, and the upper strap comprising a shoulder portion and a waist portion divided by the upper buckle; and
   a restraining assembly configured to restrain a sliding movement of the upper buckle relative to the upper strap and toward the shoulder portion when the waist portion of the upper strap is forced by a passenger's body during a collision or an emergency brake of a vehicle;
   wherein a through slot is formed on the upper buckle, the restraining assembly comprises an anti-sliding structure and a beam structure slidably disposed on the upper buckle, the beam structure is slidably disposed on the upper buckle, the through slot comprises a first portion and a second portion divided by the beam structure, the first portion is adjacent to the shoulder portion, the second portion is adjacent to the waist portion, the upper strap passes through the first portion of the through slot from bottom to top and passes through the second portion of the through slot from top to bottom, the anti-sliding structure is disposed on at least one of a wall of the beam structure and a wall of the first portion of the through slot facing toward each other and configured to engage with the upper strap, and the upper strap is engaged by the anti-sliding structure for restraining the sliding movement of the upper buckle relative to the upper strap and toward the shoulder portion when the upper strap is forced to drive the beam structure to slide relative to the upper buckle toward the wall of the through slot.

2. The harness system of claim 1, wherein the restraining assembly further comprises a stopping component detachably disposed on the shoulder portion and configured to abut against the upper buckle for restraining the sliding movement of the upper buckle relative to the upper strap.

3. The harness system of claim 1, wherein the upper strap drives the beam structure to slide relative to the upper buckle and toward the wall of the first portion of the through slot facing toward the wall of the beam structure when the upper strap is forced by the passenger's body during the collision or the emergency brake of the vehicle, and the upper strap is engaged by the anti-sliding structure for restraining the sliding movement of the upper buckle relative to the upper strap and toward the shoulder portion when the upper strap is forced to drive the beam structure to slide relative to the upper buckle and toward the wall of the first portion of the through slot.

4. The harness system of claim 3, wherein the restraining assembly further comprises a stopping component detachably disposed on the shoulder portion and configured to abut against the upper buckle for restraining the sliding movement of the upper buckle relative to the upper strap.

5. The harness system of claim 3, wherein the anti-sliding structure is disposed on the wall of the first portion of the through slot facing toward the wall of the beam structure and configured to engage with the upper strap.

6. The harness system of claim 5, wherein the restraining assembly further comprises a stopping component detachably disposed on the shoulder portion and configured to abut against the upper buckle for restraining the sliding movement of the upper buckle relative to the upper strap.

7. The harness system of claim 1, wherein the anti-sliding structure is disposed on the wall of the first portion of the through slot facing toward the wall of the beam structure and configured to engage with the upper strap.

8. The harness system of claim 7, wherein the restraining assembly further comprises a stopping component detachably disposed on the shoulder portion and configured to abut against the upper buckle for restraining the sliding movement of the upper buckle relative to the upper strap.

* * * * *